Figure 1:

C. S. LOCKWOOD.
PROCESS OF MAKING HELICAL ROLLS.
APPLICATION FILED AUG. 21, 1909.

958,144. Patented May 17, 1910.

Witnesses:
D. Gold Klang
J. W. Greenbaum.

Inventor.
Charles S. Lockwood,
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

PROCESS OF MAKING HELICAL ROLLS.

958,144.   Specification of Letters Patent.   Patented May 17, 1910.

Application filed August 21, 1909. Serial No. 513,973.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Processes of Making Helical Rolls, fully described and represented in the following specification and the accompanying drawings, forming a part of the same.

The object of the present invention is to improve the manufacture of helical rolls for use in roller bearings, in which constructions the rolls require for their most perfect operation to be truly cylindrical in form and of uniform diameter. The difficulty of producing such rolls is greatly increased where the rolls require to have a small bore in proportion to their diameter so that the coils may have sufficient thickness to sustain a heavy load.

In the present invention, the helical rolls are formed by winding a strip upon a mandrel whose diameter is relatively small, so that the coils have considerable inclination across the axis of the mandrel.

To wind a flat strip upon a mandrel at any considerable angle, contracts the inner side of the strip and extends its outer side, and produces a shallow trough-shaped cross-section, which has heretofore caused a ridge on the roll, that required grinding to remove, unless the rolls were used for a grade of bearing in which perfect rolls were not required. Where the strip is thin in relation to its width, the ridge is less prominent, but is increasingly evident as the strip is made thicker. The contraction also widens the inner side of the strip.

Since the helical rolls were first invented for roller bearings, the standard of quality in such bearings and the loads imposed upon them have greatly increased, and an accuracy of form and fit is now demanded which was not required at that time, as the roller bearings are now extensively used for automobile axles, and in many places where a heavy load is imposed upon a bearing of relatively small proportions. Such heavy loads require rolls made of relatively thick strips to secure the desired support for the load.

The present invention is designed to meet these requirements by a process of manufacturing helical rolls which operates to extend the strip as it is wound upon the mandrel and to change its cross section so that it may adapt itself completely to the cylindrical form which is required to produce a perfect roll.

The difficulties of producing a perfectly cylindrical roll by winding a flat strip upon a mandrel are illustrated in the annexed drawing, in which—

Figure 2:
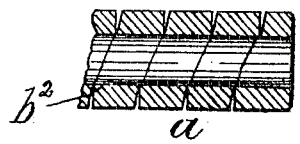
Figure 3:
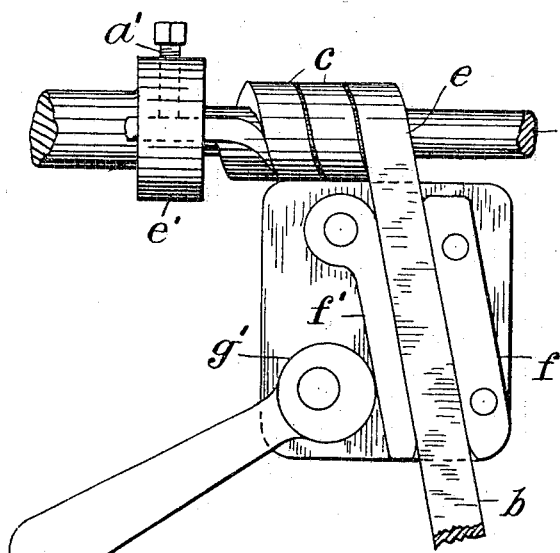
Figure 4:
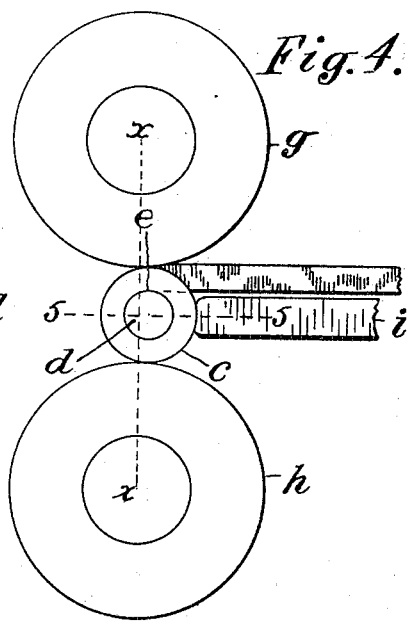
Figure 5:
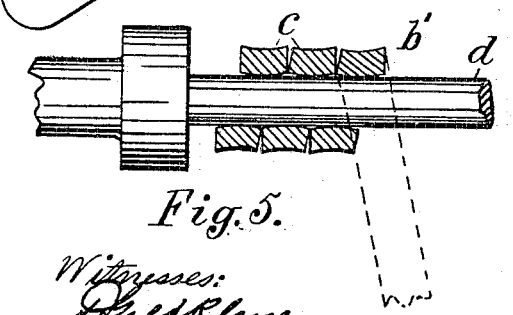
Figure 6:
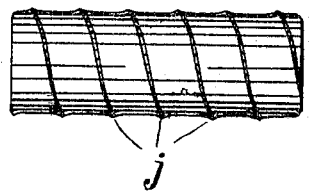

Figure 1 shows a perfect roll produced by the improved process; Fig. 2 is a longitudinal section on line 2—2 in Fig. 1, showing the correct form of the strip which fits it to the mandrel and makes its exterior cylindrical; Fig. 3 is a plan of a roll partly wound upon a mandrel and extended sufficiently to fit the mandrel perfectly; Fig. 4 is an end view of the same with the tools which form the coils; Fig. 5 shows the mandrel with a section of the roll and the strip, when the strip is not extended; and Fig. 6 is a plan of a defective roll with the spiral ridge at the joint of the coils.

*a* designates the ideal roll of a perfect cylindrical form and uniform diameter; Fig. 2 showing the close contact of the successive coils with the mandrel, producing an exterior cylindrical shape. The bore of the roll is one half its exterior diameter, thus requiring a strip quite thick in relation to its width which is necessarily limited by the size of the roll.

In Fig. 3, the strip *b* is shown wound into coils *c* upon the mandrel *d*, the strip approaching the mandrel tangentially at the point *e*. In winding a thick strip upon a small mandrel, the resistance of the strip is so great that the torsional strength of the mandrel would not be sufficient alone to wind the roll; and the primary end of the strip is therefore clamped or locked to the chuck *e'* that carries the mandrel, as indicated by the screw *a'* in Fig. 3. The rotation of the chuck thus produces an end pull or tension upon the strip during the whole winding operation, which is the only force that draws the strip through the rolls. Such pull elongates or extends the strip at the bite of the rolls.

Upon the line 5—5, in Fig. 4, which is ninety degrees from the tangential point *e*, the strip is fully bent to the curve of the roll, and its cross-section, if the strip is not extended, becomes trough shaped as shown in Fig. 5; and the strip must be actually changed in form to fit the mandrel properly. The degree of concavity in the strip is exaggerated to show it clearly, in Figs. 5 and 6.

It is evident that tension upon the strip at the tangential point where it touches the mandrel will operate to pull the strip into closer contact with the mandrel and thus bring the outer edges of the strip down against the mandrel so as to lie close against it, as shown at $b^2$ in Fig. 2. This produces a cylinder of the required character. Such tension may be produced by clamps $f$, $f'$, at opposite sides of the strip adjacent to the point indicated at $e$ in Fig. 3, one of such clamps being adjusted by a cam $g'$ to produce the required friction and tension upon the strip. Such tension may also be produced by operating rollers upon the strip, with sufficient force to reduce its thickness and extend its length under the pull of the operating chuck. Such force reduces the thickness of the strip as it is wrapped upon the mandrel, and the thicker portion of the strip thus resists the drawing of the strip through the rolls, and subjects the metal in the coils to tension where they are formed from the strip.

Fig. 4 shows rollers $g$ and $h$ which press respectively upon the upper and lower sides of the coils as they are wound upon the mandrel $d$, which rolls may be operated to reduce the thickness of the strip to any degree as it is formed into the coils.

A stretching of the strip results from such reduction of its thickness, and causes the metal reduced by the forming-rolls to crowd forwardly around the mandrel adjacent to the last formed coils, and if the head of the mandrel and the head of the strip be clamped together or otherwise held in a fixed relation upon the chuck, this forward crowding of the metal causes a great deal of needless friction, which I obviate in the present invention by winding the strip entirely by force applied to its own head; and not driving the mandrel at all, but leaving it loose to turn and adjust itself within the coils as the pressure upon the coils during the forming operation may require.

Such a method of forming the coils not only obviates friction but enables me to positively wind a long series of coils 3/8 of an inch diameter upon a slender mandrel only 3/16 of an inch diameter, which would have no torsional strength sufficient to wind the coils, and would be subjected to great torsional strain if it were revolved continuously at the same speed as the head of the strip.

The method of forming the coils by rotating the strip around a loose mandrel greatly facilitates the manufacture of spirally coiled rolls, as the use of a loose mandrel makes the pull of the strip effective in stretching the metal of the strip where coiled upon the mandrel, which conforms the strip to the mandrel better than if the mandrel were positively revolved.

I have discovered that the back-rest can be very advantageously dispensed with, by setting the mandrel at the front side of the center line, that upon which the strip $b$ is fed to the mandrel, so that the rollers tend automatically to force the coils toward the front-rest $i$ and to hold it in contact therewith during the winding operation. The pressure of the coils against the front-rest is also increased if any longitudinal tension be applied to the strip $b$, the arrangement wholly avoiding the necessity of any rest at the opposite side of the coil, and the labor of shifting such rest backwardly to disengage the completed roll when wound upon the mandrel. By using only a single "rest" $i$ at the front of the coils; the mandrel, the coils, and the strip can be manipulated with much greater facility when commencing to wind a roll and when removing the finished coil from between the rollers $g$ and $h$; which are somewhat opened or separated when making such removal. All these advantages are secured by locating the center of the mandrel and coils at one side of the line $x$—$x$, joining the centers of the rollers $g$ and $h$ which enables one "rest" to support the coils completely during the winding operation.

From the above description it will be understood that the demand for thicker and stronger rolls necessitates the use of thicker strips and the formation of a relatively small bore in the roll; to give it the required resistance to compression when in use. A bore one half the diameter of the roll is now common, which proportion for the strip tends not only to produce trough-shaped coils, but also to produce a trapezoidal cross-section in the coils, as shown in Figs. 2 and 5. The upsetting of the strip upon its inner side widens it at both inner edges, but the pulling of the coils edgewise between the rollers $g$ and $h$ (by the advance movement of the mandrel) crowds the metal over to the rear edges of the coils, and leaves one edge of each coil nearly square. These effects are produced by the use of a strip having square or rectangular edges primarily, which form of strip permits the formation of a more perfect cylindrical roll.

The trapezoidal cross-section is not detrimental to the rolls, but a trough shaped coil destroys the cylindrical form unless corrected in some effectual manner.

The method of manufacture herein set forth thus changes a rectangular strip into coils of trapezoidal cross-section, while it simultaneously changes the natural trough-shape of the coils to a true cylindrical form, thus causing two changes in the cross-section of the metal.

This method of manufacture is a great improvement in the art of making helical rolls, as the use of thick strips to make extra heavy and strong rolls tends to produce ridges upon the rolls much greater in proportion than was heretofore common.

The means employed in practicing the present invention are wholly immaterial, as the invention consists in the changing of the cross-section of the strip as it is wound into coils, and in the steps of the process which are new in themselves.

Having thus set forth the nature of the invention what is claimed herein is:

1. The process of forming helical rolls with closely adjacent coils, which consists in progressively bending into coils a strip of metal and simultaneously compressing the successive coils while positively extending the length of the metal, whereby the tendency to form trough-shaped coils is obviated, as set forth.

2. The process of forming helical rolls, which consists in winding a strip of greater length than thickness, with such width applied to a mandrel, and compressing the successive coils below the normal thickness of the strip while positively extending the length of the strip where wrapped upon the mandrel.

In testimony whereof I have hereunto set my hand in the presence of two subscribing witnesses.

CHARLES S. LOCKWOOD.

Witnesses:
J. W. GREENBAUM,
THOMAS S. CRANE.